(12) United States Patent
Silver et al.

(10) Patent No.: US 9,936,064 B2
(45) Date of Patent: Apr. 3, 2018

(54) AUTOMATIC IDENTIFICATION OF A VEHICLE DRIVER BASED ON DRIVING BEHAVIOR

(71) Applicant: Tango Networks, Inc., Richardson, TX (US)

(72) Inventors: Andrew Silver, Frisco, TX (US); Lathan Lewis, Dallas, TX (US)

(73) Assignee: Tango Networks, Inc., Richardson, TX (US)

( * ) Notice: Subject to any disclaimer, the term of this patent is extended or adjusted under 35 U.S.C. 154(b) by 174 days.

(21) Appl. No.: 14/955,507

(22) Filed: Dec. 1, 2015

(65) Prior Publication Data

US 2016/0088147 A1 Mar. 24, 2016

Related U.S. Application Data

(63) Continuation of application No. 14/600,395, filed on Jan. 20, 2015, now Pat. No. 9,201,932, which is a continuation of application No. 14/140,492, filed on Dec. 25, 2013, now Pat. No. 8,938,227, which is a continuation of application No. 13/531,547, filed on Jun. 24, 2012, now Pat. No. 8,634,822.

(51) Int. Cl.
| | |
|---|---|
| *H04W 4/04* | (2009.01) |
| *H04M 1/725* | (2006.01) |
| *G06F 17/30* | (2006.01) |
| *H04W 4/16* | (2009.01) |
| *G06N 99/00* | (2010.01) |

(52) U.S. Cl.
CPC .... *H04M 1/72577* (2013.01); *G06F 17/3053* (2013.01); *G06F 17/30943* (2013.01); *G06N 99/005* (2013.01); *H04W 4/046* (2013.01); *H04W 4/16* (2013.01)

(58) Field of Classification Search
CPC ...................................................... H04W 4/04
See application file for complete search history.

(56) References Cited

U.S. PATENT DOCUMENTS

| | | | | |
|---|---|---|---|---|
| 6,505,780 | B1* | 1/2003 | Yassin | B60R 25/2081 235/384 |
| 8,301,108 | B2* | 10/2012 | Naboulsi | G08B 21/06 340/575 |
| 2004/0093155 | A1* | 5/2004 | Simonds | H04L 67/12 701/532 |
| 2005/0116829 | A1* | 6/2005 | Koenig | B60R 16/0231 340/576 |
| 2007/0124027 | A1* | 5/2007 | Betzitza | B60W 40/02 701/1 |
| 2008/0105482 | A1* | 5/2008 | Yamaguchi | G05B 15/02 180/271 |

(Continued)

*Primary Examiner* — Christopher M Brandt

(57) ABSTRACT

A method and apparatus are disclosed that identify a motor vehicle operation and whether a driver is operating a mobile device. One example of operation may include a method that includes receiving vehicle data based on active operation of a vehicle and compiling a candidate driver identification profile (DIP) based on the received vehicle data. The method may also include comparing the candidate DIP to a pre-stored DIP and determining a match between the candidate DIP and the pre-stored DIP. The method may also include applying a restriction to a mobile station operated by a driver of the vehicle responsive to the match determination.

20 Claims, 6 Drawing Sheets

(56) References Cited

U.S. PATENT DOCUMENTS

| | | | |
|---|---|---|---|
| 2008/0245598 A1* | 10/2008 | Gratz | B60R 25/1004 180/287 |
| 2009/0307182 A1* | 12/2009 | Eytchison | H04L 63/08 706/54 |
| 2010/0036560 A1* | 2/2010 | Wright | B60R 16/037 701/36 |
| 2010/0087987 A1* | 4/2010 | Huang | B60W 40/08 701/36 |
| 2010/0268460 A1* | 10/2010 | Wan | G01C 21/3415 701/414 |
| 2010/0332266 A1* | 12/2010 | Tamir | G06Q 30/0283 705/4 |
| 2011/0137520 A1* | 6/2011 | Rector | H04M 1/72577 701/36 |
| 2011/0161262 A1* | 6/2011 | Jager | H04M 1/72569 706/12 |
| 2012/0040665 A1* | 2/2012 | Liu | H04W 4/008 455/426.1 |
| 2012/0053793 A1* | 3/2012 | Sala | B60N 2/0244 701/45 |
| 2012/0206252 A1* | 8/2012 | Sherony | B60W 30/12 340/438 |
| 2012/0253568 A1* | 10/2012 | Uyeki | B60L 11/1846 701/22 |
| 2013/0073114 A1* | 3/2013 | Nemat-Nasser | B60W 40/09 701/1 |
| 2013/0085652 A1* | 4/2013 | McGuffin | F02D 41/266 701/101 |
| 2013/0096731 A1* | 4/2013 | Tamari | G06F 11/3013 701/1 |
| 2013/0210406 A1* | 8/2013 | Vidal | H04W 4/00 455/418 |

* cited by examiner

AUTOMATIC IDENTIFICATION OF A VEHICLE DRIVER BASED ON DRIVING BEHAVIOR

CROSS REFERENCE TO RELATED APPLICATIONS

This application is a continuation of U.S. patent application Ser. No. 14/600,395, filed Jan. 20, 2015, entitled "AUTOMATIC IDENTIFICATION OF A VEHICLE DRIVER BASED ON DRIVING BEHAVIOR", issued U.S. Pat. No. 9,201,932, issued Dec. 1, 2015, which is a continuation of U.S. patent application Ser. No. 14/140,492, filed Dec. 25, 2013, entitled "AUTOMATIC IDENTIFICATION OF A VEHICLE DRIVER BASED ON DRIVING BEHAVIOR", issued U.S. Pat. No. 8,938,227, issued Jan. 20, 2015, which is a continuation of U.S. patent application Ser. No. 13/531,547, filed Jun. 24, 2012, entitled "AUTOMATIC IDENTIFICATION OF A VEHICLE DRIVER BASED ON DRIVING BEHAVIOR", issued U.S. Pat. No. 8,634,822, issued Jan. 21, 2014, the entire contents of which are hereby incorporated by reference.

TECHNICAL FIELD OF THE INVENTION

The present invention is generally related to automatic identification of a vehicle driver and corresponding response procedures for adjusting the vehicle profile and/or limiting driver access to a mobile device.

BACKGROUND OF THE INVENTION

Conventionally, identifying the driver of a vehicle requires expensive biometric sensors or manual intervention. For example, a driver may be identified by a particular finger scanner or other biometric sensor that has prior knowledge of the driver's physical characteristics.

As mobile phone use continues to grow in popularity and drivers are continually using their mobile phones for phone calls, text messaging and other purposes, the question of driver safety remains a concern. As a result, there is an opportunity to provide a simple and affordable way to thwart driver mobile phone use while operating a moving vehicle. In addition, driver preferences may also be customized to accommodate the driver based on the results of the driver identification.

SUMMARY OF THE INVENTION

One example embodiment of the present invention may include a method that includes receiving vehicle data based on active operation of a vehicle, compiling a candidate driver identification profile (DIP) based on the received vehicle data, comparing the candidate DIP to at least one pre-stored DIP, determining a match between the candidate DIP and the at least one pre-stored DIP, and applying at least one restriction to a mobile station operated by a driver of the vehicle responsive to the match determination.

Another example embodiment may include an apparatus that includes a receiver configured to receive vehicle data based on active operation of a vehicle and a processor configured to compile a candidate driver identification profile (DIP) based on the received vehicle data, compare the candidate DIP to at least one pre-stored DIP, and determine a match between the candidate DIP and the at least one pre-stored DIP. The apparatus may also include a transmitter configured to transmit at least one restriction to a mobile station operated by a driver of the vehicle responsive to the match determination.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention may include a method, device, system or computer generated software program and corresponding computer operating system to control the use of a mobile station or mobile device during the operation of a motor vehicle. The controlling of the mobile device may include limited user access to dialing/receiving calls, transmitting and/or receiving text messages and/or transferring other mobile data while operating the motor vehicle. A motor vehicle may be referred to synonymously with a transport vehicle, such as an automobile, motorcycle, truck, bus, boat, train, aircraft, all-terrain vehicle (ATV), etc.

Figure 1:
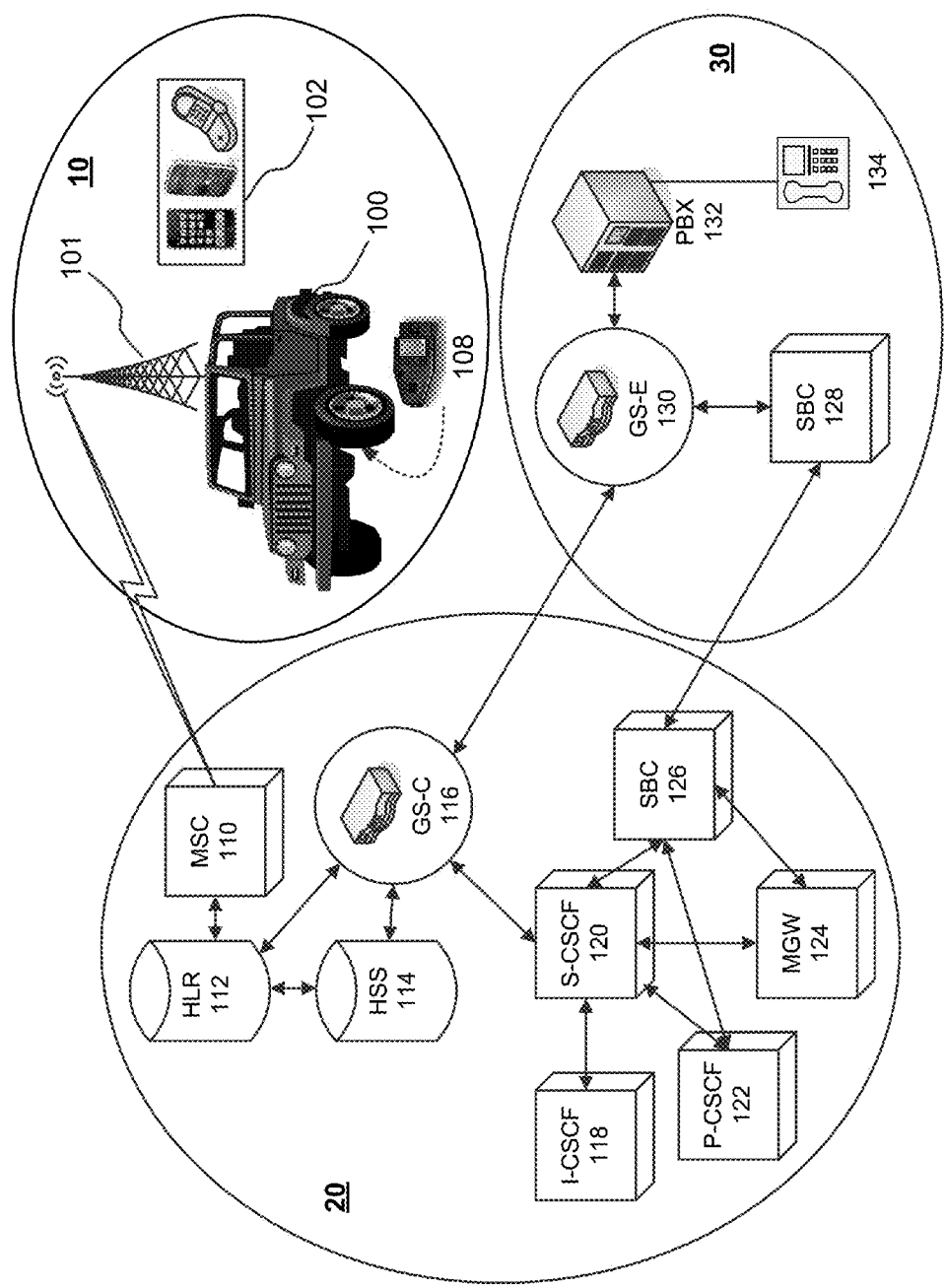
FIG. 1 illustrates an example communication network infrastructure configured to establish communications with a vehicle according to example embodiments.

FIG. 1 illustrates a mobile network and related communication system corresponding to example embodiments of the present invention. Referring to FIG. 1, an operating network area of a mobile device 10 is illustrated as being in communication with a mobile network 20 and an enterprise network 30. A mobile device 102 may have a subscription to a mobile service on the mobile network 20 operated by a mobile telephone network service provider and/or service carrier. The mobile device may be a smartphone, cell phone, tablet computing device, or other device capable of communicating with a cellular infrastructure (i.e., base station 101).

The mobile device 102 may maintain a subscription for service on the mobile telephone network service provider's network 20. The subscription may be provisioned and stored in memory in the carrier's home location register (HLR) 112 and/or a home subscriber server (HSS) 114. Such subscription information may include the subscription information for enabling mobile device calls to be originated and terminated, text messages to be originated and terminated, and for mobile data to be requested and delivered.

To control the mobile device 102, the mobile subscriber's profile stored in the HLR 112/HSS 114 is accessed before and/or when a call attempt or text message is originated or terminated with the mobile device 102. In the case of a call, the mobile switching center (MSC) 110 or call session control function (i.e., interrogating—I, servicing—S, and proxy—P—CSCFs) 118-122, verify the subscriber profile from the HLR and/or HSS to determine the services of the subscriber.

In an IP multimedia system (IMS) network, the S-CSCF obtains the initial filter criteria (IFC) information which may instruct the S-CSCF to query a session initiation protocol (SIP) application server (SIP-AS) represented by carrier gateway server (GS-C) 116 before routing a session. Similarly, in a circuit-switched network, the MSC 110 obtains the trigger information which may instruct the MSC 110 to query a service control point (SCP) represented by 116 before routing a call. The SCP or SIP-AS 116 may then analyze the origination and/or termination information and apply logic to instruct the MSC 110 or S-CSCF 120 on how to route the call, session or text message. The SCP or SIP-AS 116 can be split between two nodes, in this case the carrier gateway server 116 and the edge gateway server 130 which may be located in an external network such as an enterprise.

A call or data session that is originated from or terminated to the mobile device 102 may have an alternative treatment applied based on a service condition. For example, a call may be allowed or disallowed or re-routed in response to the service condition. Similarly, the call may be intercepted by the system and stored in memory along with the intended destination if the vehicle is being operated by the user of the mobile device. A call may be augmented with a predefined indication or recorded message to alert the user of the service condition with or without prompting for acknowledgement and/or reason, but still allowing the call to be received. A call may be received and/or a call termination can be re-routed to voicemail or to a recorded message for the calling party (e.g., "the user is unavailable at this time"). A terminating text message can be stored for later delivery to the mobile device 102, an originating text message from the mobile device 102 can be prevented from being delivered, etc.

Mobile data transferred to or from the mobile device 102 may require a mobile data gateway or packet gateway such as a gateway GPRS support node (GGSN) that is connected to a carrier's serving GPRS support node (SGSN), or alternatively, a foreign agent (FA) that is connected to a carrier's Home Agent (HA). For example, a mobile data request transferred from a mobile device 102 can be prevented or delayed from being delivered to a server or redirected to another server, service or function.

A mobile data response can also be prevented or delayed from being delivered to the mobile device 102. The message may be blocked or intercepted by temporarily storing the message in memory and releasing the message into the network once a predefined condition and/or restriction has passed (e.g., a communication blocked location). In other words, the message may be preserved or just re-routed until certain conditions have been satisfied. Similarly, a mobile data request or response can be augmented with an indication or recorded message to alert the user of the condition with or without a prompting for acknowledgement and/or a reason, but still allow the message to proceed.

According to example embodiments of the present invention, a mobile network may be configured with a gateway server (GS) that can act as a SCP, a SIP-AS and/or a mobile data gateway. The GS may be split into two functions, the GS-C 116 located in the carrier network 20 and the GS-E 130 located at the edge of the network, such as in an enterprise or other service control network (SCN) 30.

An enterprise may represent a corporation that desires to control the mobile phones of their employees, such as UPS® or Fedex® controlling the mobile phones of their drivers. In such a case, it is possible that the GS-E 130 is also connected to the enterprise voice communications networks including for example, a private branch exchange (PBX) 132 coupled to a telephone device 134, and an IP-PBX and/or unified communications (UC) system. A media gateway (MGW) 124 and SBCs 126 and 128 may provide a communication path to the enterprise network 30. A switched circuit network (SCN) may represent a hosted service provider that offers a service to many small or large corporations for controlling the mobile phones of the corporation's employees. An SCN may also offer such a service to consumers or agencies, for example to enable parents to control the mobile phones of their children, schools to control the mobile devices of their bus drivers, or municipalities or governments to control the use of mobile phones of users that have received infractions for unsafe driving or for using a mobile phone in a school zone.

In other configurations, the GS-E 130 can also be located in the carrier's network 20, or be hosted by a third party in a multi-tenant model that offers the service to many individual enterprises and/or consumers from a single GS-E 130. The GS-C 116 and GS-E 130 can also be combined into a single function allowing the policy and services of the GS-E 130 to be handled by the combined GS (GS-C 116 plus GS-E 130) node.

According to another example embodiment an on-board diagnostic (OBD) system may be used. OBD systems are in most automobiles today. The OBD-II standard was introduced in the mid 1990's, and has been mandated on all automobiles manufactured for sale in the United States since Jan. 1, 1996. The same OBD-II or similar systems are used in most countries around the world.

All OBD-II automobiles have an OBD-II compliant connector 108 located in the passenger compartment of an automobile 100 that is easily accessible from the driver's seat. This port provides information about the vehicle's state, including malfunction indicators, diagnostic trouble codes and other vehicle information for self-diagnosis and reporting capabilities.

Example embodiments of the present invention provide accurate identification of the driver of a vehicle without expensive biometric sensors or manual intervention. Similar to audio fingerprinting, where an acoustic fingerprint is used to identify an audio sample, example embodiments provide a "driver fingerprint" or in this case a "driver footprint", which is used to identify a specific driver that is operating a vehicle. For example purposes only, acoustic fingerprint is a condensed digital summary, deterministically generated from an audio signal, that can be used to identify an audio sample or quickly locate similar items in an audio database. Practical uses of "acoustic fingerprinting" includes identifying songs, melodies, tunes, or advertisements for procedures, such as video file identification. Media identification using acoustic fingerprints can be used to monitor the use of specific musical works and performances on radio broadcast, records, CDs and peer-to-peer networks.

With "driver fingerprinting/footprinting" the driver may be automatically identified via a driver identification determination process (DIDP). Services can automatically be set for the driver. Example services may include in-vehicle settings such as certain vehicle peripheral activities, including but not limited to radio station or other entertainment equipment preferences, seat settings, climate control, steering wheel settings, as well as vehicle services such as, for example, a distracted driving service which can apply specific policies to a particular driver to manage the use of a mobile phone or other electronic device when the vehicle is in a driving session. In the case where the driver has been identified for the purpose of a distracted driving service, this identification can also be used to eliminate other occupants as drivers such that they can be allowed to utilize their mobile devices while in the same moving vehicle as the identified driver.

Processing algorithms can be applied to monitor information supplied by the vehicle and other inputs such as location (e.g., via GPS), electronic key fobs, Bluetooth mobile device connections. User "footprint" samples can be compared against various user profiles previously captured to identify a match. Profiles can be continuously updated throughout a vehicle's trip, and over time (i.e., multiple trips) with new information. For example, if a driver moves from their home or office, or changes vehicles, or the time of day they operate a vehicle.

Examples of user or driver specific behavior inputs that can be used and logged include but are not limited to whether a vehicle was unlocked with manual key or an electronic key fob, whether an electronic key fob with presence detection was used. Other inputs may include detection of an external mobile device (e.g., mobile phone) with a near-field communications (NFC) capability, and which accessories in a vehicle have been left activated from a previous trip (e.g., radio active set to a specific station or music media such as CD, DVD, mp3 that were played).

Other behavior inputs and user specific information may include an acceleration/deceleration rate of a vehicle, based on a pedal position sensor, an accelerometer located in the vehicle that may be co-located within a telematics (TM) module plugged into an on-board diagnostic (OBD) port, a vehicle microprocessor and memory, or a mobile station/phone or other on-board device. Other devices may include a built-in vehicle device, such as a telematics module (e.g., GM OnStar®, or a transponder module plugged into the OBD port that can be used to measure/calculate/store vehicle speed/acceleration information and log such information). Any of these devices may maintain and store records that are later used to identify a current operator of the vehicle by comparing present behavior to past behavioral records.

According to example embodiments, location information of a mobile device operated by a vehicle driver may be obtained by using any known location identification technologies, such as global positioning system (GPS), base station triangulation, etc., to determine the vehicle and driver's location at various points throughout a driving session. For example, the start of a vehicle driving session may begin at a particular home location (i.e., garage) and a subsequent driving route may be identified as a regular or known destination, such as the driver's office. The identification procedure may be performed by comparing the current route information with route information stored in memory about the vehicle's previous operation cycles. The route information may also be stored in the mobile device and/or a remote server. The user may be identified by a unique mobile station identifier and/or via his or her driving behavior attributes. The vehicle driver's attributes may then be cross-referenced with the vehicle route to ensure the driver is identified correctly. Time of day and/or day of the week information may also be identified as inputs to further identify habitual information, such as when a driving session begins or ends, and when combined with location information, such input information may be used to discern a likely destination and therefore a likely driver identification.

Other driver behavioral input events and information may include various different events used by the driver determination algorithms to increase the probability of correctly identifying a specific driver among a list of multiple known drivers. The known drivers may be identified by name, code or other identification parameter that is associated with their records and logged driving information. The process can be continuous such that the driver identification algorithm continuously evaluates driver behavior attributes and inputs throughout a live driving session, and can change a decision or conclusion of who is the actual driver as more information is provided and refined throughout the session. A rating algorithm may be used to associate a particular likelihood that the driver attributes received represent a particular driver profile. Examples of additional driver behavior inputs may include an engine start-up and warm-up behavior. For example, does the driver use only the key or starter button to start the vehicle, or do they depress the brake, accelerator and/or clutch simultaneously as the vehicle is started, and once started does the driver depress the accelerator to increase vehicle velocity, or allow the vehicle to warm up, etc. The behavioral actions, such as stepping on the brake, pressing the gas pedal, turning on the radio or other entertainment equipment, selecting a radio station, starting acceleration, stopping acceleration, average velocity of the vehicle, etc., may be logged and compared to a driving timetable of events from previous driving sessions to properly identify the driver based on known driver attributes from a driver information database.

Other driving attributes which may be identified, stored and compiled for driver determination purposes may include identifying an initial direction of a vehicle (e.g., reverse, forward, which gear selection was made and a time reference for maintaining or changing a gear, etc.). Timing events may also be identified, such as the amount of time between an engine start operation and a vehicle being placed in gear, an amount of time between a vehicle being placed in gear and an accelerator being depressed, an amount of time between a vehicle being placed in gear and a vehicle exceeding a specific speed or falling below a specific speed (e.g., time to arrive at first stop sign), speed at which the vehicle traverses a stopping event, etc.

The database of driving attributes (driver "fingerprints/footprints") and recorded driving/operating sessions may be stored locally in the vehicle, externally in a network-based server, or in a combination thereof. Depending on the number of comparisons required, this can also impact the algorithm in terms of processing events required, number of inputs required and time to calculate a probable determination. For example, a private vehicle used in a family of three drivers may only have to identify a match of any one of the three drivers (e.g., father, mother and teen driver). However, a commercial fleet vehicle that may be operated by any number of employees of a company on a given day may have a larger list of comparison candidates. In the extreme case of multiple candidates such as, a publicly operated vehicle or a rental car, it may be required to match against a national or international "fingerprint/footprint" profile database of users.

Figure 2:
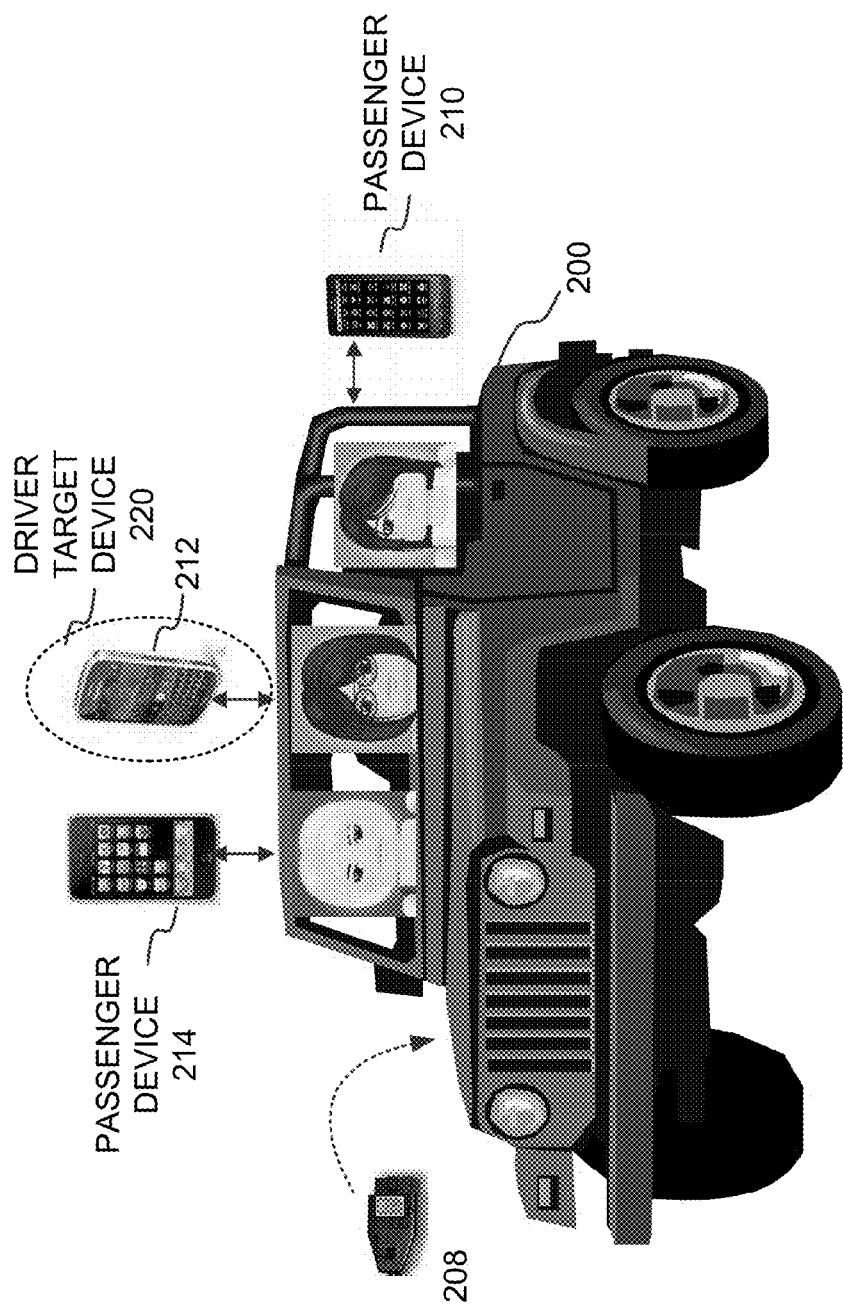
FIG. 2 illustrates an example vehicle with multiple individuals operating multiple mobile devices, according to example embodiments.

FIG. 2 illustrates an example vehicle configured to perform a driver identification procedure according to example embodiments of the present invention. Referring to FIG. 2, a vehicle 200 includes a built-in OBD-II compliant connector 208 that is configured to communicate with one or more mobile devices 210-214. A driver identification determination module (DIDM) may be part of the OBD-II compliant connector 208, the operating software stored in the vehicle 200 and/or mobile devices 210-214 using device client software with GPS. Similarly, the DIDM may be part of a server located within the vehicle or outside the vehicle in the network.

The DIDM processing may include a vehicle telematics device that plugs into the OBDII port in the vehicle 200, which can be utilized to communicate with a network server storing policies for mobile device usage. The policies may be queried and applied to any or more of the known mobile devices via their respective profiles. In this example, the OBDII device 208 may establish a mobile data connection over the wireless network and communicate with the network server (GS-C 116, GS-E 130, MSC 110, I-CSCF 118, S-CSCF 120, P-CSCF 122, etc.) to identify vehicle status information including whether the vehicle is on or off. Other status information may include the vehicle speed and/or whether a vehicle speed threshold has been passed (e.g., a speed up or slow down threshold).

The network server GS-C 116 and/or GS-E 130 may then store this vehicle status information and/or utilize the status information to apply policies to a target user or set of target user's mobile devices. Multiple mobile phone subscriptions may be associated with a single or multiple ODB-II devices. For example, a single OBDII device 208 located in the vehicle 200 can be used to report vehicle status information for applying policies to multiple mobile phone users, such as a husband, wife and teen driver. For mobile phones that are capable of supporting and executing a software application, it may be possible to enhance the DIDM processing in order to determine which person is driving the vehicle so as to apply specific policies to the driver's mobile phone only. This approach may be used to identify the driver by their driving fingerprint/footprint and thwart any mobile device communications for that driver target device 220.

One example use case for outbound calls placed while attempting to operate the vehicle may include a target user attempting to originate an outbound call. In operation, a target user originates an outbound call via a target user device 220. Before the call is routed, the user will be prompted for "Recorded Consent." For example, the call may re-route to an automated message that instructs the driver "It has been determined your vehicle is in motion. Please select one of the following options to complete this call, or hang up. Your selection will be recorded—press or say "1" to override this message, press or say "2" if the vehicle is not moving, press or say "3" if you are not operating the vehicle, press or say "4" if you are using a legal hands-free system." With the recorded consent, the driver may enter a status of "accountable bypass" based on the "recorded consent." Such a feature will maintain a record of the caller's selection for subsequent accountability records (i.e., insurance companies, parents, police, municipal government, criminal, etc.).

In another example based on an inbound call, the inbound call is placed to a target user operating a target user device 220 while operating the vehicle. Before the call is routed to the end user's device 220, the call originator (not shown) may hear a message: "The subscriber you are attempting to reach is not recommended to receive calls at this time. Press or say "1" to override this message in the event of an urgency and your call will be connected. Otherwise please hold and you will be transferred to voicemail."

If the call originator selects "1", the call will be routed, and the target user's mobile device will ring. If the target user answers the call they will be prompted for "Recorded Consent." For example, the recording may play: "It has been determined your vehicle is in motion. Please select one of the following options to complete this call, or hang up, your selection will be recorded, press or say "1" to override this message, press or say "2" if the vehicle is not moving, press or say "3" if you are not operating the vehicle, press or say "4" if you are using a legal hands-free system, press or say "5" to place this call on hold until the vehicle is stopped.

In the event that the target user selects "5", the call originator may hear: "your call will be connected shortly, please hold." The call will remain on hold until the vehicle has slowed below a predetermined policy disengagement threshold (PDT). The call may then be connected, followed by an announcement tone to both parties. If the target user hangs-up or does not answer, the originator will be routed to the target user's voicemail. The "Option 5" may enable the driver to inform the caller to hold on a moment while the driver safely brings the vehicle to a stop, at which point the call is connected to the target user device 220. If, however, the driver drives away after the call is connected, as soon as the vehicle exceeds the policy engagement threshold (PET), the call processing system may apply any policy including breaking into the active call and playing a message or applying predefined "account bypass with recorded consent" (ABRC) functionality, redirecting to voicemail, or just ending the call. The call processing is governed by a network-based system of operations since a client-based application is not operating in the call path and can be overcome by skilled user intervention.

Once the driver has been identified, all other passengers in the same vehicle can be allowed to utilize their mobile device without restrictions, with alternative restrictions to that of the driver or the same restrictions as the driver. For example, the mobile device of a passenger could have specific restrictions imposed which do not allow the speaker phone to be used while the vehicle is in motion so as not to disturb the driver, or to restrict the music/video player to play through headphones only. To identify the passengers, location information of their mobile devices can be used and compared with the location information of the driver and/or the vehicle itself such as, an onboard GPS, onboard telematics module (TM) the vehicle, etc. If the location of a person's mobile phone continues to be near the location of the driver's mobile phone and/or the location of the vehicle as the vehicle continues its motion then it is likely that the person's mobile phone is in the vehicle and that the person is a passenger.

Figure 3:
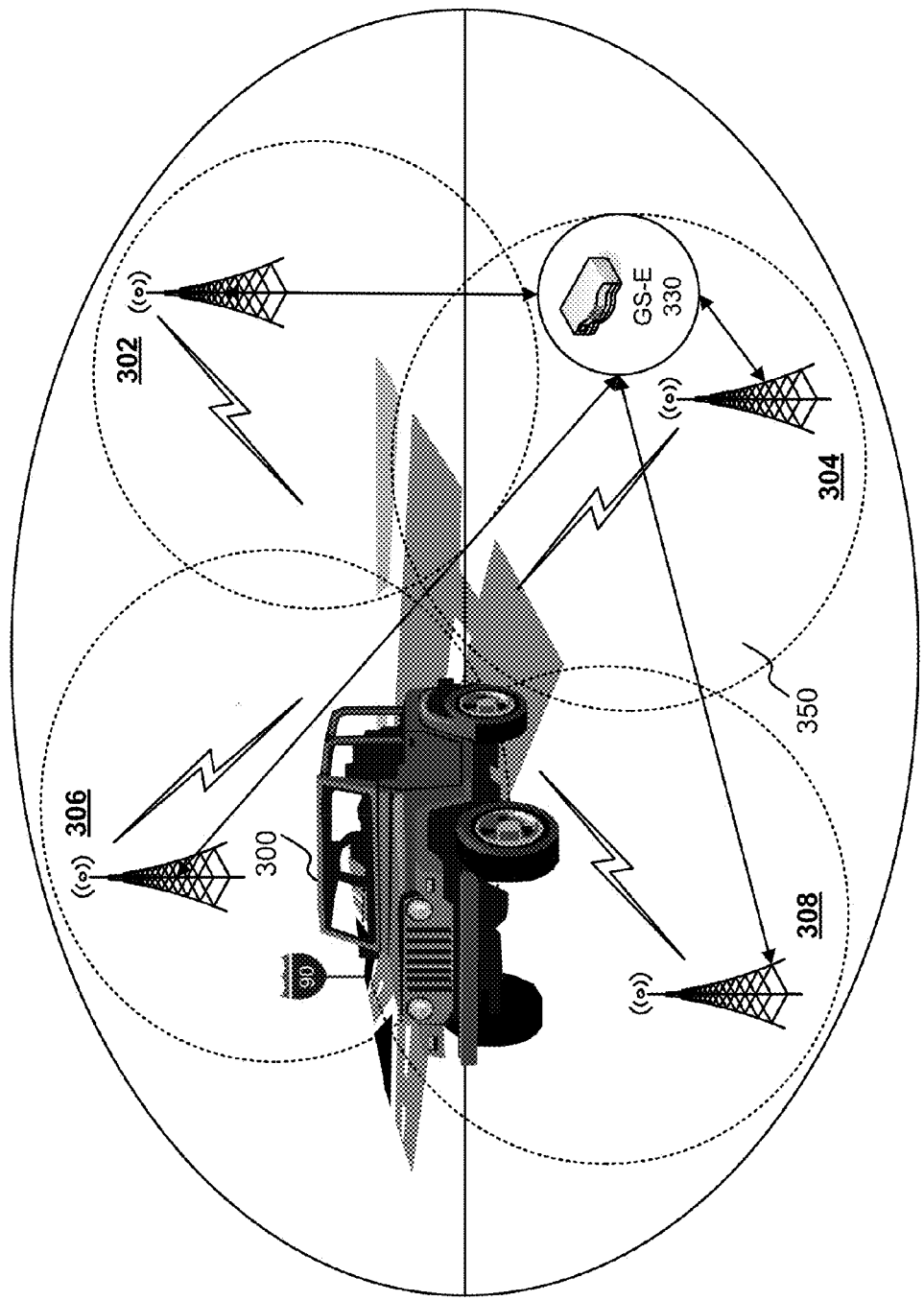
FIG. 3 illustrates an example moving vehicle example, according to example embodiments.

FIG. 3 illustrates an example moving vehicle example according to example embodiments. Referring to FIG. 3, a vehicle 300 may be traveling along a highway while communicating with various mobile base stations, small cell or femtocell communication stations 302-208. In operation, when the network server GS-E 330 determines the vehicle is moving via the OBDII device 208, and a defined speed threshold has been triggered, such as the vehicle has exceeded 15 mph or the vehicle has slowed below 5 mph, then the network server may transmit a message for each mobile device that supports the client application and is also associated with the specific OBDII device. The message may be initiated by the network server 330 and transmitted via each base station in communication via the OBDII device 208. The message may provide an indication to activate the device's onboard GPS and determine the speed at which that device is traveling and report that information back to the network server 330. The network server 330 can then assess which of the mobile phones 210, 212, 214, etc., are located in the vehicle 300 based on whether they are moving at a speed similar to the vehicle 300 or not. A comparison of vehicle speed may be matched to the mobile device speed by comparing GPS coordinates associated with the vehicle with those associated with GPS data received from the mobile devices own GPS functionality. In another example, once it is determined that the vehicle is moving via the vehicle's GPS system, the mobile devices may be associated with the moving vehicle via an identification procedure processed through the OBDII device 208. In another example, when the network server GS-E 330 is informed the vehicle is on or has exceeded a speed threshold via the OBDII device 208, the GS-E 330 may store this information. When an event occurs such as a mobile call, text or session origination or termination, the network elements such as MSC 110, S-CSCF 120 or mobile data gateway) will trigger to the GS-C before the call, text or session is routed. The GS-C will then query the GS-E which will verify the previously stored status of the vehicle and apply the appropriate policy (e.g. restriction, redirection, ABRC, etc.) from the network. Because in this example the policies are invoked in the network and not on the device using a client, the policies and restrictions work with all mobile devices, and are not limited to select smartphone devices capable of running applications.

In another example, the network server GS-E 330 may not be informed of some or all vehicle events such as PET or PDT. When an event occurs such as a mobile call, text or session origination and/or termination, the network elements such as MSC 110, S-CSCF 120 or mobile data gateway) will trigger to the GS-C before the call, text or session is routed. The GS-C will then query the GS-E which will verify the status of the vehicle in real-time by sending a message to the vehicle's TM (telematics module) which will report back the current vehicle speed and status. The GS-E 330 will then apply the appropriate policy (e.g. restriction, redirection, ABRC, etc.) from the network. In this example it is possible that the GS-E 330 may allow certain events, such as a call to proceed while the GS-E 330 queries the TM in order to prevent additional delays to a call setup which can take as long as ten or more seconds to establish. Should the GS-E receive a response from the TM that the vehicle is in motion and that the restrictions need be applied, the call can be stopped, redirected or other treatments applied. This implementation may significantly reduce the traffic requirements between the TM and the network since the TM does not have to send messages each time the vehicle exceeds or falls below speed thresholds or other vehicle events.

A telematics module (TM) associated with the on-board processing engines of the vehicle (i.e., OBDII device, vehicle processors, etc.) may begin recording the vehicle data, such as but not limited to: vehicle location (via GPS, triangulation or other location determination technologies), time, date, system status (e.g. vehicle status on/off, engine idle/active), engine rpm, accelerator pedal depression location and/or direction and/or rate and/or acceleration, accelerometer rate and/or acceleration and/or direction, vehicle speed, steering wheel angle/position, vehicle body angle/position/attitude, brake pedal depression location and/or direction and/or rate and/or acceleration, transmission gear position, engine coolant temperature, ambient temperature, etc.

The DIDA obtains TM data for analysis to identify a pattern that can be associated with a particular driver. A candidate pattern is compared with previously stored patterns that have been associated with a set of particular drivers. When a pattern match is identified, the positive driver identification results may be stored in memory and can be queried or reported to external systems. Each time a positive pattern of a candidate pattern (i.e., current pattern) is matched with a previously stored pattern, the credibility of the previously stored pattern is increased. Pattern credibility increases and decreases over time as the matching process ensues.

The greater the credibility of a pattern, the greater the likelihood of correctly identifying the driver. Lack of matches over time for a particular pattern may result in decreased credibility. When the credibility of a pattern falls below a specified threshold, it is possible for that pattern to be discarded. Over time, the number of credible driver identification procedures (DIPs) should match the number of drivers of a particular vehicle. DIPs can also be shared across vehicles or fleets of vehicles, enabling the DIDA to assist in identifying a specific driver across many vehicles. Once a positive driver identification match has been achieved, the DIDA may continue to process additional data in an effort to further confirm the certainty of the decision or to overrule the decision based on increasingly credible data. As a result, a previously positive match could be modified following the assessment of additional data input from the TM. New pattern information can be stored for later comparisons.

Data from the TM is organized into "snapshots" (i.e., profiles) based on event criteria such as time, the occurrence of a specific event, memory status, etc. For example, a TM snapshot can be created at a specific time, such as every second beginning from when the TM has received notification that the vehicle was powered on. Additional data snapshots may be accumulated every time the vehicle changes gears or direction, every time a memory threshold is met, such as when the buffer is filled, etc. A driver identification profile (DIP) is a distinguishable pattern derived from the aggregation of a sufficient amount of TM snapshot data that is used to identify a specific driver.

A driver identification profile candidate (DIPC) may include the aggregation of a sufficient number of TM snapshots into a distinguishable pattern that can either be used to compare against a list of previously stored DIPs in order to identify a match, or to be stored as a new DIP for later comparison against other DIPCs. The DIDA may continuously receive input data from the TM as well as other external sources. The DIDA may also be designed such that it will only begin processing upon notification of a specific event, for example, when the vehicle has been powered on, and stop processing when, for example, the vehicle has been powered off.

Figure 4:
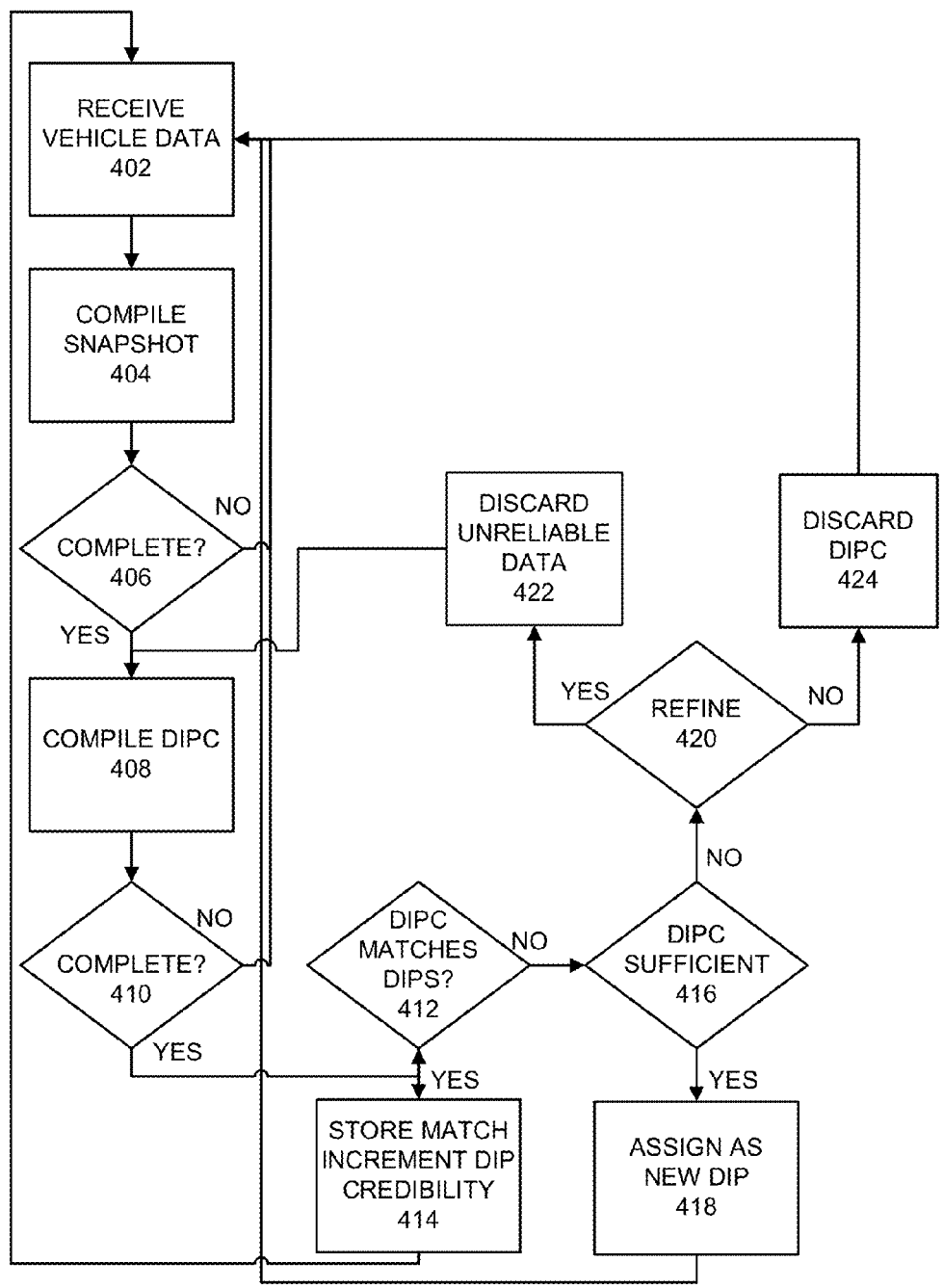
FIG. 4 illustrates a flow diagram illustrating a method of operation according to example embodiments.

FIG. 4 illustrates an example flow diagram of an example data receiving and processing procedure according to example embodiments. Referring to FIG. 4, a TM compiles data received from the vehicle 402 into a "snapshot" 404 triggered by the occurrence of a specific event, for example, a specific time. A new TM snapshot is created with other previously obtained TM snapshots into a driver identification profile candidate DIPC, which is based on at least one obtained snapshot. A determination is made as to whether the processing is complete 406 and enough data is received to compile a DIPC. If not the processing is repeated, and if so, the DIPC is then compiled 408 based on the new vehicle data received (e.g., turn-on, acceleration, movement, location, speed, etc.).

A completion determination is again performed 410 to determine whether the DIPC information is sufficient. Next, the DIPC calculated is compared against a list of previously stored driver identification profiles (DIPs) in order to identify a match 412. If no DIPs are currently stored, the DIPC itself can be stored as a DIP and a corresponding DIP credibility may be incremented to increase the likelihood that a match is correctly identified 414. Each time a DIP match is determined, the credibility of the DIP is increased. Over time, DIPs that do not match DIPCs may lose credibility or fall behind the credibility of other DIPs. If the credibility falls below a specific threshold, or the disparity with other DIPs increases beyond a specific threshold, the DIP may be deleted from the list of DIPs used for matching purposes. Or, alternatively, a new DIP may be assigned 418 assuming the DIP is deemed sufficient 416.

A "match" is declared when a DIPC matches a DIP that has sufficient credibility, at which point a specific driver is considered identified. When this matching occurs, the matching DIP can be stored for external systems to query, or alternatively the matching DIP can be reported to external systems. Following a successful match, the DIP credibility is increased. If a match cannot be declared, the procedure may assess whether the current DIPC can be declared as a new DIP 418. This can occur if the DIPC data is considered sufficient, so that there is enough reliable data to form a distinguishable pattern such that it can later be used for comparison matching against other DIPCs. If the DIPC is insufficient to be declared a new DIP, the DIPC may either be discarded 424, or it can be refined with the addition of new TM snapshots 420. If it is to be refined, the data considered unreliable can be discarded 422 and the DIPC can then be refined with additional snapshots.

The refining operation 420 of FIG. 4 may provide a snapshot that is taken every "X" seconds and the totality of those snapshots may be used to create a profile candidate, which is compared to the pre-stored driver identification profile (DIPs). The comparison yields an answer as to who is driving the vehicle. For example, if the profile is the same for two or more DIPs then further checking may be performed to identify other profiles to find the right DIP.

According to one example, three people enter a car and shut the door, all of them have their mobile phones on and the driver starts the car. The driver may proceed by modifying the seat, mirror, radio station, which are all identifiable actions. The driver then begins accelerating, braking, driving a certain route, creating a velocity pattern, etc. The driver's actions are logged by the OBD device or in-vehicle server, and stored in memory locally in the car. The driver's actions may also be stored in a remote cloud network, device. The driver's actions are transmitted wirelessly from the OBD device to a base station connected to a remote server. The remote server processes the data to determine a match with a pre-stored profile. The server can send the vehicle feedback so the driver of the car's phone is identified and restricted from calling/texting etc.). Alternatively, the server can store the status of the vehicle in the network so when events occur, such as a mobile call, text or session origination or termination, the network elements, such as MSC 110, S-CSCF 120 or mobile data gateway can trigger the server to verify the previously stored status of the vehicle and then apply the appropriate policy (e.g. restriction, redirection, ABRC, etc.) from the network by providing instructions to the network elements.

Figure 5:
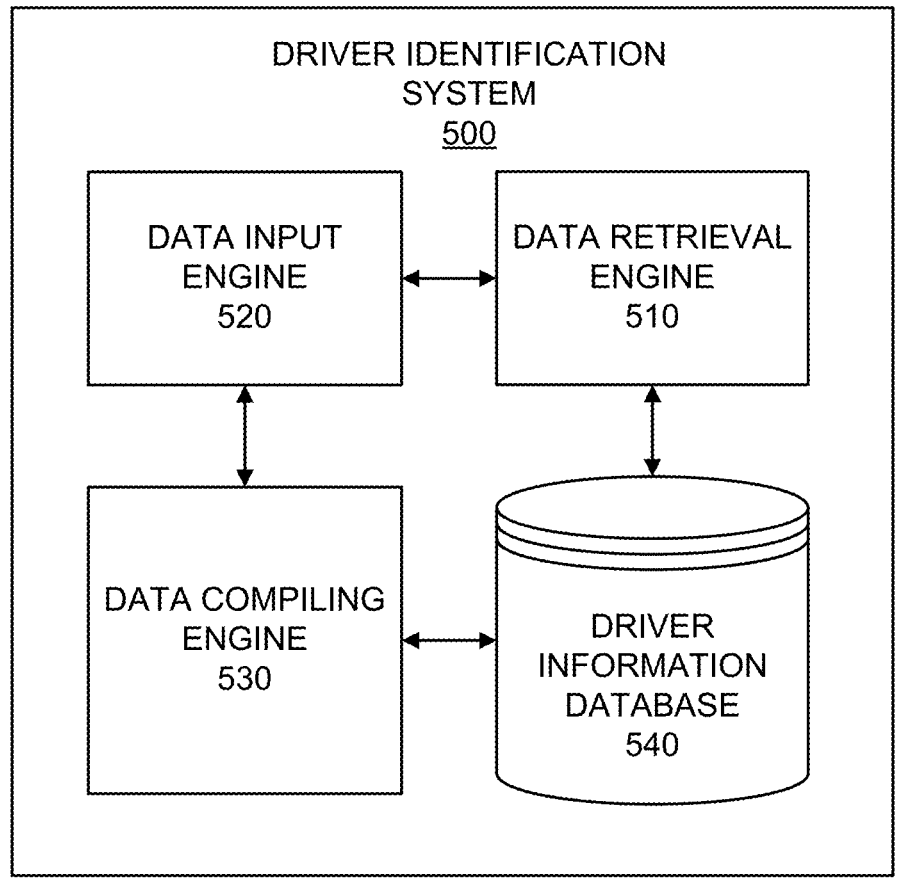
FIG. 5 illustrates an example driver identification system according to example embodiments of the present invention.

FIG. 5 illustrates an example driver identification system 500 according to example embodiments. Referring to FIG. 5, the driver identification system 500 includes a driver information database 540 that stores new and older driver record information. The system may also include a data retrieval engine 510 configured to retrieve and store driver record information. A data input engine 520 receives new information from the present driver and provides it to the data compiling engine 530 which compares the present driver information to the previously stored driver information. The system 500 may be a single device or multiple devices operating across a communication network.

In operation, vehicle data may be received by the data input engine 520 based on active operation of a vehicle (i.e., the vehicle is operating, the vehicle is moving, etc.). The vehicle data may be accumulated and compiled to determine a candidate driver identification profile (DIP) based on the received vehicle data. The vehicle data may then be compared to determine a candidate DIP by comparing the candidate DIP to at least one pre-stored DIP to determine a match between the candidate DIP and the at least one pre-stored DIP. As a result, if a match is made, then at least one restriction may be enacted to a mobile station operated by a driver of the vehicle (i.e., no incoming or outgoing calls, text messages, data sessions, etc.). The restriction may be a message that includes a mobile device identifier, user information, and other pertinent information used to specify whether the device is to be powered-off or temporarily disabled. The message may include a disable command that eliminates the incoming and outgoing calls and/or text messages. The message may also include an automated voice response redirect that is provided to the caller in the event of an incoming or outgoing call.

The vehicle data may include any one or more of a vehicle acceleration or deceleration rate, accelerator and/or brake pedal position information, vehicle route information, and one or more vehicle peripheral activities, such as radio station or other entertainment equipment preferences, vehicle seat settings, vehicle mirror settings, vehicle steering wheel settings, and vehicle climate control. The operations of the system 500 may also include incrementing a DIP credibility score based on the DIP match to increase a DIP credibility threshold value for subsequent comparison operations. If the DIP credibility threshold values falls below a predetermined threshold value then the pre-stored DIP may be deleted from memory. When determining the match between the candidate DIP and the at least one pre-stored DIP, a match may be declared when the candidate DIP matches a pre-stored DIP that has a predetermined credibility threshold. The candidate DIP may be declared a new DIP and stored in memory for subsequent DIP comparison operations.

Example embodiments are preferably realized in a hardware device, such as, a server, computer, cellular phone, or other mobile terminal device etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of the other figures.

Figure 6:
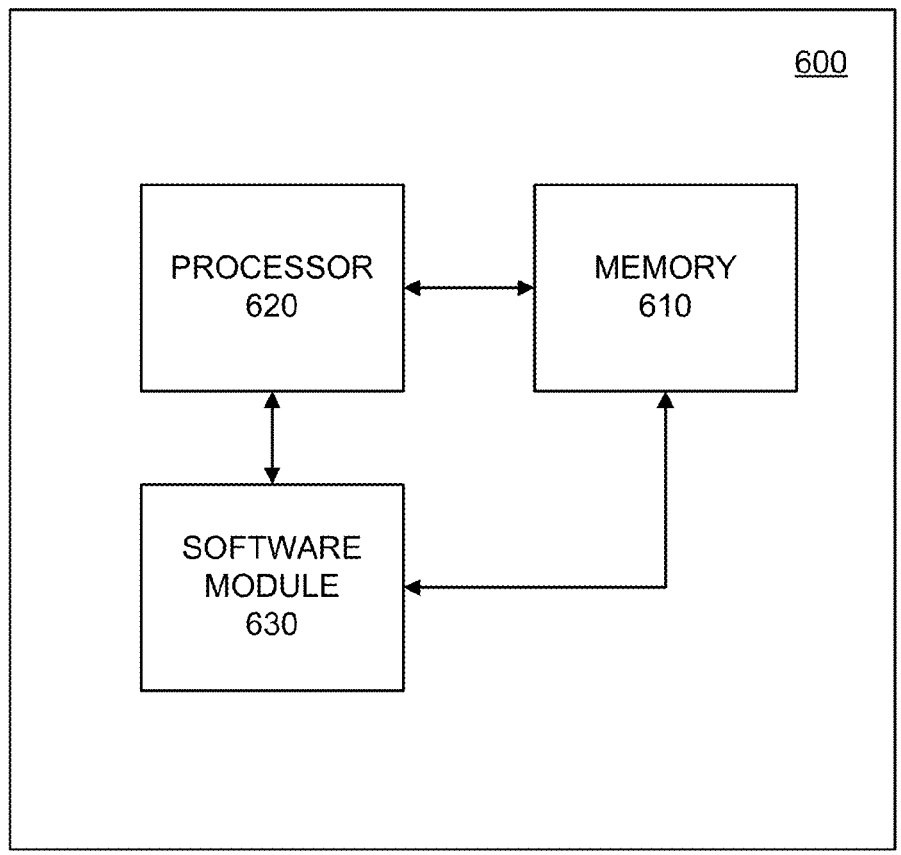
FIG. 6 illustrates an example network entity configured to store instructions and processing hardware for performing operations according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
compiling, via a computing device, a candidate driver identification profile (DIP) based on received vehicle data captured during operation of a vehicle;
incrementing a DIP credibility score of at least one pre-stored DIP stored in memory of the computing device if there is a DIP match between the candidate DIP and the at least one pre-stored DIP, wherein incrementing the DIP credibility score comprises increasing the DIP credibility score to a value closer to or above a predetermined credibility threshold;
identifying, via the computing device, a vehicle driver by determining a match between the candidate DIP and the at least one pre-stored DIP when the DIP credibility score is equal to or above the predetermined credibility threshold; and
applying, based on one or more mobile station usage policies, at least one restriction to a mobile station operated by the vehicle driver.

2. The method of claim 1, wherein the vehicle data comprises at least one of a vehicle acceleration rate, pedal position, vehicle route information, time between driver operated events, and one or more vehicle peripheral activities.

3. The method of claim 2, wherein the vehicle peripheral activities comprise entertainment system preferences, vehicle seat settings, vehicle mirror settings, vehicle steering wheel settings, and vehicle climate control.

4. The method of claim 1 comprising applying the at least one restriction to the mobile station of the vehicle driver responsive to the DIP match.

5. The method of claim 4, wherein the at least one restriction is related to the DIP match.

6. The method of claim 1, comprising deleting the at least one pre-stored DIP from memory if the DIP credibility score is below a predetermined threshold.

7. The method of claim 1, further comprising declaring the candidate DIP a new DIP and storing the new DIP in memory for subsequent DIP comparison operations.

8. An apparatus, comprising:
a receiver configured to receive vehicle data captured during operation of a vehicle;
a processor configured to:
compile a candidate driver identification profile (DIP) based on the received vehicle data;
increment a DIP credibility score of at least one pre-stored DIP stored in memory if there is a DIP match between the candidate DIP and the at least one pre-stored DIP, wherein the DIP credibility score in incremented to increase the DIP credibility score to a value closer to or above a predetermined credibility threshold;
identify a vehicle driver by determining a match between the candidate DIP and the at least one pre-stored DIP when the DIP credibility score is equal to or above the predetermined credibility score; and
apply, based on one or more mobile station usage policies, at least one restriction to a mobile station operated by the vehicle driver.

9. The apparatus of claim 8, wherein the vehicle data comprises at least one of a vehicle acceleration rate, pedal position, time between driver operated events, vehicle route information, and one or more vehicle peripheral activities.

10. The apparatus of claim 9, wherein the vehicle peripheral activities comprise entertainment equipment preferences, vehicle seat settings, vehicle mirror settings, vehicle steering wheel settings, and vehicle climate control.

11. The apparatus of claim 8 comprising a transmitter configured to transmit the at least one restriction to the mobile station operated by the vehicle driver.

12. The apparatus of claim 11, wherein the at least one restriction is related to the DIP match.

13. The apparatus of claim 8, wherein the processor is configured to delete the at least one pre-stored DIP from memory if the DIP credibility score is below a predetermined threshold.

14. The apparatus of claim 8, wherein the candidate DIP is declared a new DIP and stored in memory for subsequent DIP comparison operations.

15. A non-transitory computer readable storage medium configured to store instructions that when executed cause a processor to perform:
    compiling, via a computing device, a candidate driver identification profile (DIP) based on received vehicle data captured during operation of a vehicle;
    incrementing a DIP credibility score of at least one pre-stored DIP stored in memory of the computing device if there is a DIP match between the candidate DIP and the at least one pre-stored DIP, wherein incrementing the DIP credibility score comprises increasing the DIP credibility score to a value closer to or above a predetermined credibility threshold;
    identifying, via the computing device, a vehicle driver by determining a match between the candidate DIP and the at least one pre-stored DIP when the DIP credibility score is equal to or above the predetermined credibility threshold; and
    applying, based on one or more mobile station usage policies, at least one restriction to a mobile station operated by the vehicle driver.

16. The non-transitory computer readable storage medium of claim 15, wherein the vehicle data comprises at least one of a vehicle acceleration rate, pedal position, time between driver operated events, vehicle route information, and one or more vehicle peripheral activities.

17. The non-transitory computer readable storage medium of claim 16, wherein the vehicle peripheral activities comprise entertainment equipment preferences, vehicle seat settings, vehicle mirror settings, vehicle steering wheel settings, and vehicle climate control.

18. The non-transitory computer readable storage medium of claim 15 comprising applying the at least one restriction to the mobile station operated by the vehicle driver responsive to the DIP match.

19. The non-transitory computer readable storage medium of claim 18 wherein the at least one restriction is related to the DIP match.

20. The non-transitory computer readable storage medium of claim 15, further comprising at least one of:
    deleting the at least one pre-stored DIP from memory if the DIP credibility score is below a predetermined threshold; and
    declaring the candidate DIP a new DIP and storing the new DIP in memory for subsequent DIP comparison operations.

* * * * *